Oct. 9, 1928.
T. MIDGLEY
1,687,302
METHOD OF MAKING MULTIPLE BEAD TIRE CASINGS
Filed April 1, 1926 — 2 Sheets-Sheet 1
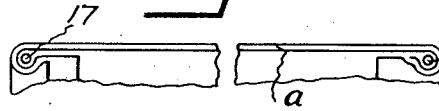
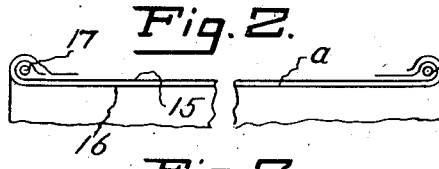
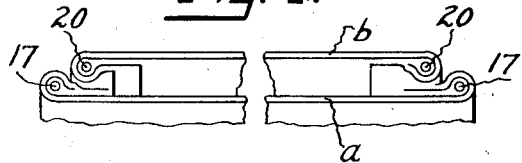
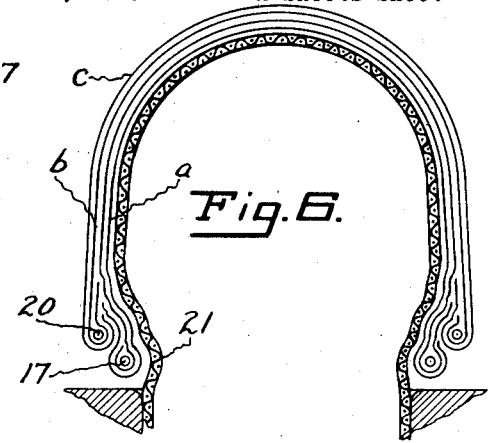
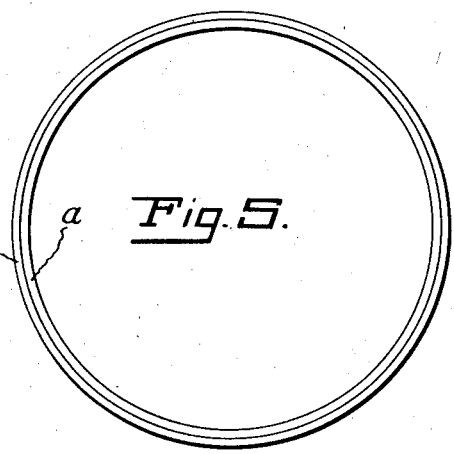
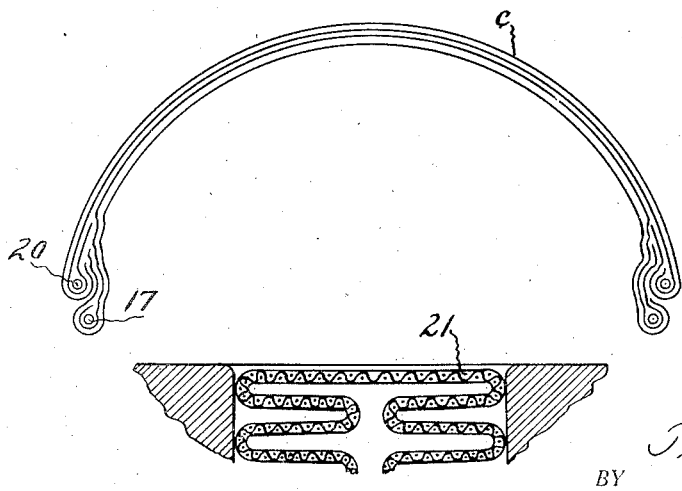
INVENTOR.
Thomas Midgley
Edward C. Taylor
BY
ATTORNEY.

Oct. 9, 1928.  
T. MIDGLEY  
1,687,302  
METHOD OF MAKING MULTIPLE BEAD TIRE CASINGS  
Filed April 1, 1926  2 Sheets-Sheet 2

INVENTOR.  
BY Thomas Midgley  
Edward L. Taylor  
ATTORNEY.

Patented Oct. 9, 1928.

1,687,302

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING MULTIPLE-BEAD TIRE CASINGS.

Application filed April 1, 1926. Serial No. 99,161.

This invention relates to the building of the carcasses of tire casings. It has for its object the production, by the flat band method, of tire carcasses having a plurality of bead anchorages in each bead edge. It has for a particular object the production of such a tire having the edges of the plies concealed between the several layers of carcass material. It has for another object a method of this type in which each bead edge contains a plurality of bead anchorages of different diameter with the anchorages of greatest diameter nearest the inside of the casing. It has other and further objects which will appear from the following description.

It has hitherto been found impractical to construct by the flat band method tire casings having a plurality of bead anchorages in each bead edge. As far as I am aware, it has been the universal custom in practicing this method to construct only tires having a single bead anchorage in each edge to which all of the plies of fabric are anchored. In many cases it is desirable to anchor the plies in separate groups, this being particularly true in the larger sizes of tires. According to my invention I am enabled to adapt this method to the production of tires in which separate anchorages are provided for separate groups of cords. I am also enabled to produce tires having in each bead edge anchorages of different diameters with the anchorages of greatest diameter near the inside of the casing. This is of considerable importance in safeguarding the quality of the tires since, if the anchorages which are nearest the outside of the tire are too great in diameter, they approach the top of the flanges of the rim upon which the tire is mounted in use and cause trouble due to the breaking down of the tire at this point.

My invention will now be described in its preferred form, with reference to the accompanying drawings in which Fig. 1 is a diagrammatic sectional view showing one method of forming a band for use in my method;

Fig. 2 is a similar view showing this band inverted and ready for assembly;

Fig. 3 is a similar view of a second band ready for assembly;

Fig. 4 is a similar view showing the bands assembled;

Fig. 5 is a side view of the bands as shown in Fig. 4, taken on a somewhat smaller scale;

Fig. 6 is a diagrammatic sectional view showing the assembly of Fig. 4 being stretched and consolidated;

Fig. 7 is a similar view showing the condition of the band after stretching;

Figure 8:
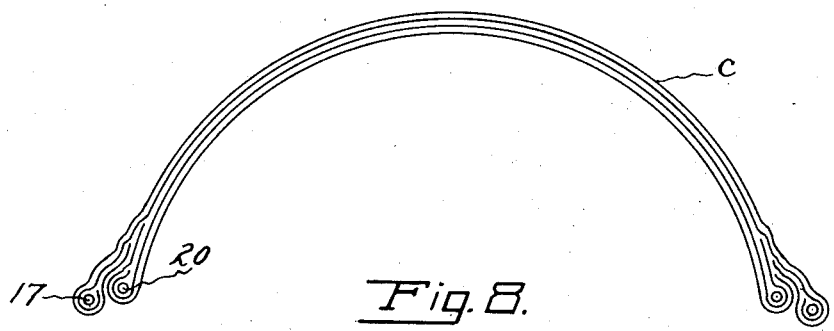
Fig. 8 is a similar view showing the band of Fig. 7 inverted.

In practicing this method I first prepare a plurality of substantially flat, annular bands with their edges secured to bead anchoring members. One of these bands is shown at $a$ in Fig. 2, and is composed of plies 15 and 16 folded at their edges around bead anchorages 17. Preferably this band is constructed by the method shown in my prior application Serial No. 49,696, filed August 12, 1925, and by the machine shown in my prior application Serial No. 83,209, filed January 23, 1926. If the band is prepared by this method and on this machine, it will first be formed as shown in Fig. 1 with the edges of the band turned inwardly around the anchorages, and thereafter inverted to bring the edges of the ply on the outside as in Fig. 2.

The second band is formed as at $b$ in Fig. 3, and is composed of plies 18 and 19 folded at their edges around bead anchorages 20.

If this band is constructed by the method and on the machine above referred to, no inversion is required as it is preferable to use the band with its edges turned inwardly around the anchorages. The bead anchorages 20 are of preferably slightly greater diameter than the anchorages 17. The spacing between the bead anchorages 20 is also made less than that between the bead anchorages 17. The purpose of this variation in dimensions between the two bands is to permit their superposition as shown in Fig. 4, in which the band $b$ is placed around the band $a$ with the anchorages 20 lying slightly within the anchorages 17.

The assembled bands are now subjected to a stretching action which expands their central portions as shown in Fig. 6. This may be done by an expansible bag 21, or by any other suitable device. This expansion presses the two bands closely together and, since the material forming the plies is, as is customary in tire building, coated with uncured rubber in an adhesive condition, the several plies will be caused to stick firmly together. Upon the contraction of the bag 21 the composite band indicated generally by $c$ will assume the general form indicated in Fig. 7.

Figure 9:
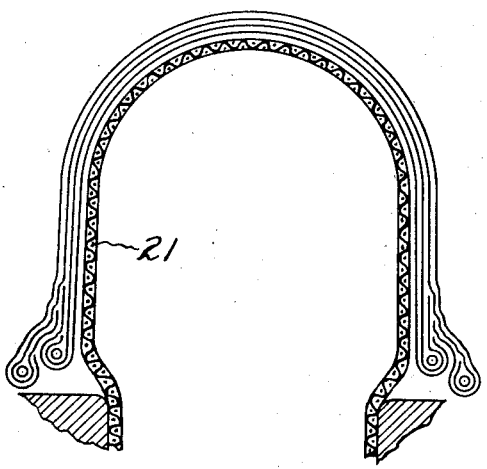
Fig. 9 is a similar view showing a further expansion step applied to the band of Fig. 8.
Figure 10:
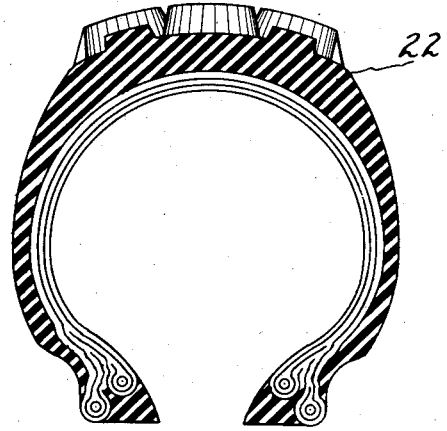
Fig. 10 is a diagrammatic sectional view of a tire constructed in accordance with the foregoing views.

If it is desired to construct a tire in which the bead of maximum diameter will be on the outside, the assembled band $c$ may have the desired covering rubber applied and be vulcanized in tire form in this condition. As stated above, however, tires so constructed are not thoroughly satisfactory from the standpoint of quality, and it is preferable to utilize the whole of my invention as it is described below. According to this preferred method the band $c$, after having been stretched as described, is inverted as in Fig. 8, bringing the bead 20 which is of the largest diameter on the inside. This inverted band is then given a second stretching as on the bag 21 and as indicated in Fig. 9. The second stretching tightens the plies around the beads and straightens out any slight waviness in the fabric which is due to the inversion. This band may then have covering rubber 22 applied and be vulcanized into tire form as indicated in Fig. 10.

It will be noted that, in the preferred form of the invention as described, the folded edges of the several plies are concealed between the two assembled bands. This avoids any danger of these folded edges pulling away from the body of the material and presenting a roughened surface which might injure the tube if these edges were located at the inside of the casing. Furthermore the beads 17 of the smaller diameter are located at the outer corner of the beaded edge of the tire, thus avoiding any danger of the outer bead anchorages lying so high in the tire that they will cause difficulty in cutting the tire adjacent the flanges of the rim. It will also be noted that the band $b$, which was of narrower width than the band $a$, is now located at the inside of the tire. The distance from bead anchorage to bead anchorage across the inside of the tire carcass is less than the distance from bead anchorage to bead anchorage of the plies at the outside of the carcass, both because of the additional radius at this point and because of the slight additional distance due to the difference in diameter of the beads 17 and 20. The amount to which the several plies are stretched is therefore equalized by this invention, the ply of the narrower width having the least distance to expand in the finished tire. This is of importance in equalizing the action on the different plies of the strains which the tire must stand in use.

Figure 11:
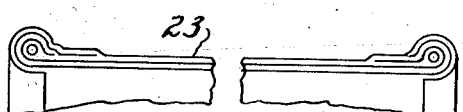
Fig. 11 is a diagrammatic sectional view of a modification adapted for tires having more than four plies, this view showing the first band in a condition corresponding to Fig. 2.
Figure 12:
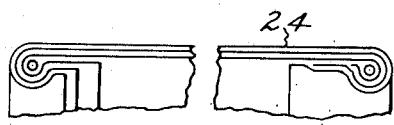
Fig. 12 is a similar view showing a modified second band, corresponding to Fig. 3.
Figure 13:
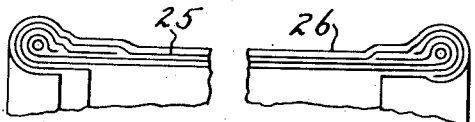
Fig. 13 is a similar view showing a further modification in which both additional plies are applied to the first band.

In case it is desired to construct tire casings having more than four plies, these additional plies may of course be folded around the anchorages in the same way as the plies 15, 16, 18 and 19 described. It is preferable, however, to apply these additional layers of material in a somewhat different manner. After the band $a$ has been prepared in the form of Fig. 2 as by the inversion of a band prepared in the shape of Fig. 1, an additional layer of material 23 may be located upon it. This need not be folded entirely around the beads as was the case with the other plies, but may either stop short or extend slightly beyond the central line of the bead as indicated in Fig. 11. If a still further ply is desired a ply 24 may be added to the band $b$ as shown in Fig. 12. Fig. 13 shows the two plies 25 and 26 added to the band $a$. In any of these cases the subsequent assembly of the bands and their stretching proceeds as in accordance with the process described above.

Having thus described my invention, I claim:

1. A method of building tire carcasses comprising forming a band of carcass material with its edges enclosing bead anchorages, forming a second band of narrower material enclosing anchorages of slightly greater diameter than those in the first band, superposing the two bands with the second band outside, stretching the central portion of the bands, inverting the assembly, and forming the assembly into tire shape while inverted.

2. A method of building tire carcasses comprising forming a band from a pair of superposed plies of material with their edges folded outwardly around a pair of annular bead anchorages, forming a second band from a second pair of superposed plies with their edges folded inwardly around a pair of annular bead anchorages of slightly greater diameter than those in the first band, superposing the two bands with the second band outside and with the folded edges of the bands in contact with each other, stretching the central portion of the united bands, inverting the assembly, and forming the assembly into tire shape while thus inverted.

3. A method of building tire carcasses comprising forming a plurality of separate bands of carcass material with their edges secured to annular bead anchorages, the anchorages in the several bands being of differing diameters, superposing the several bands, and shaping the assembly into tire form.

THOMAS MIDGLEY.